Jan. 30, 1968    R. A. WELLS    3,366,332
TEMPERATURE SENSITIVE CONTROL
Filed April 8, 1966    2 Sheets-Sheet 1

INVENTOR.
ROBERT A WELLS
BY Darley & Darley
ATTORNEYS

INVENTOR.
ROBERT A. WELLS

United States Patent Office 3,366,332
Patented Jan. 30, 1968

3,366,332
TEMPERATURE SENSITIVE CONTROL
Robert A. Wells, Baldwin, N.Y., assignor to Fairchild Hiller Corporation, Bay Shore, N.Y., a corporation of Maryland
Filed Apr. 8, 1966, Ser. No. 541,297
21 Claims. (Cl. 236—82)

ABSTRACT OF THE DISCLOSURE

A control device in which changes in temperature are sensed by a probe and converted to a movement thereof. The probe movement operates a pilot valve to produce a corresponding change of pressure and the pilot pressure change is used to operate a metering valve which is connected to a device to change the temperature of the fluid sensed by the probe. The control device has provision for amplifying the pilot pressure change so that relatively small changes of probe movement can result in large movements of the metering valve. A system is also provided in which a second control device operates to control a pressure supplied to the first device to provide greater anticipation of system temperature changes.

This invention relates to control valves and more particularly to a novel control valve which is responsive to a sensed temperature for producing a control pressure.

It is an object of this invention to provide a novel valve for producing a control pressure in response to a sensed temperature.

A further object is to provide a temperature sensitive control valve with an arrangement for amplifying the effect of the temperature change which controls the valve output pressure.

Another object is to provide a temperature sensitive control valve and anticipator for operation in a heat control system.

An additional object is to provide a temperature sensor for a control valve formed by a rod and tube arrangement which expands or contracts in accordance with the temperature sensed, the expansion or contraction being used to control a pilot valve.

Still a further object is to provide a temperature sensitive valve whose temperature set point can be adjusted by supplying an external pressure signal to the valve.

Other objects and advantages of the present invention will become more apparent upon reference to the following specification and annexed drawings in which.

In accordance with the present invention a control valve is provided which is responsive to a sensed temperature. The valve includes a probe for sensing a temperature and converting any change into a linear movement which is used to operate a pilot valve. The pilot valve in turn controls a metering valve which produces a control pressure used, for example, to operate an air inlet valve which supplies warm air to the place where the probe senses the temperature. In a preferred embodiment of the invention, the pressure change produced by the pilot valve is amplified by a diaphragm assembly. The diaphragm assembly is also responsive to an externally supplied adjusting pressure for setting the temperature point about which the valve operates.

Figure 1:
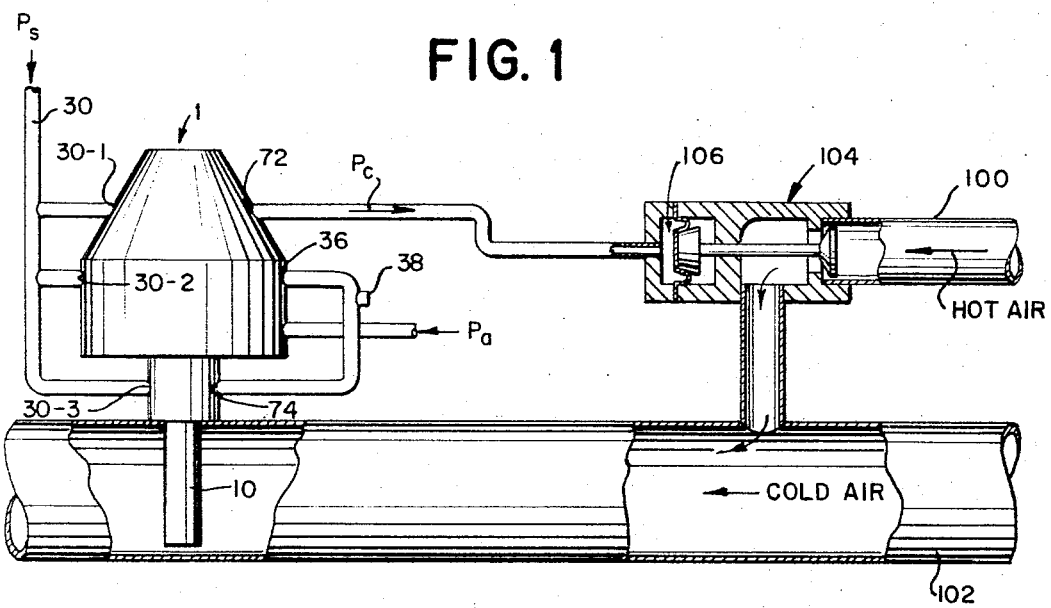
FIGURE 1 is a schematic diagram of one type of heat control system in which the novel control valve of the present invention can be utilized.

FIGURE 1 shows in schematic form one general type of system in which the temperature sensitive control valve 1 of the present invention is utilized. Here, hot air from a source (not shown) in a duct 100 is to be mixed with cold air in a main duct 102 to achieve a desired temperature. The hot air in duct 100 is supplied to an inlet valve 104 whose opening is controlled by a diaphragm operated portion 106 under the influence of control pressure $P_C$ from control valve 1. The construction of inlet valve 104 is such that when control pressure $P_C$ increases, diaphragm section 106 opens valve 104 to permit more hot air from duct 100 to be mixed with the cold air in duct 102 to increase the temperature of the mixed air.

The temperature of the mixed air is sensed by a probe assembly 10 located in duct 102. Valve 1 receives operating pressure $P_S$ from a source (not shown) and is operated by the probe sensed temperature to produce control pressure $P_C$ for diaphraghm 106 to open and close inlet valve 104 in a manner to maintain a constant predetermined temperature in duct 102. Control valve 1 is also constructed to use pressure $P_A$ from a remote source (not shown) to adjust the temperature point about which the temperature sensitive control valve 1 is to operate to maintain the constant temperature.

Figure 2:
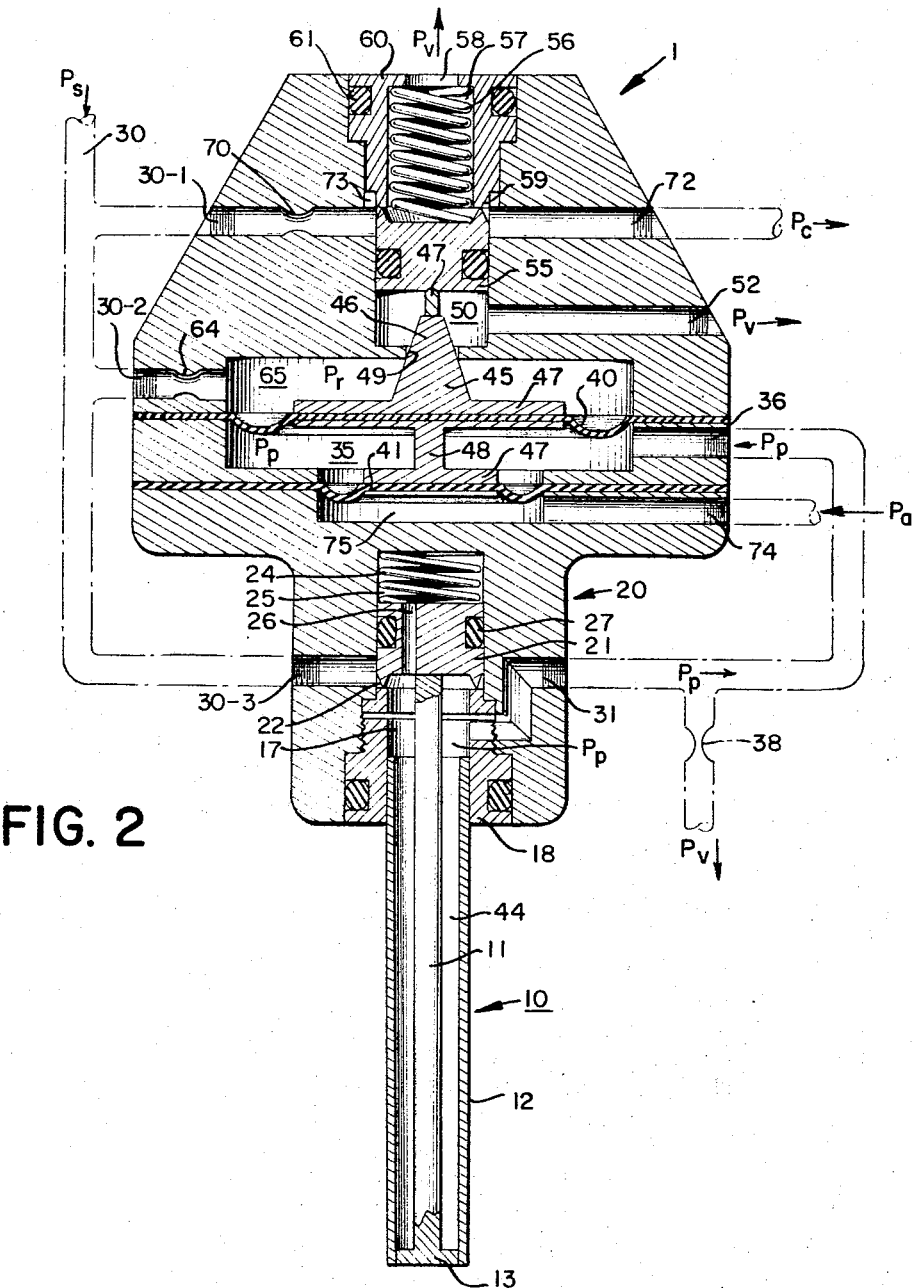
FIGURE 2 is an elevational view, primarily in cross-section, of a preferred embodiment of valve in accordance with the present invention.

FIGURE 2 shows the preferred embodiment of control valve 1. Here, the temperature sensitive probe 10 is formed by an inner rod member 11 and a coaxial outer tube member 12 which are joined together at their lower ends by any suitable material or process at an enlarged portion 13 on the rod 11. Rod 11 is preferably formed of a suitable material, such as Invar, with a relatively low coefficient of thermal expansion while tube 12 is of a material having a higher coefficient of expansion, such as stainless steel.

The upper end of tube 12 is fixedly connected, by any suitable means, to a bore 17 in the seat 18 of a pilot valve portion of control valve 1 which is at the lower end of the valve housing 20. The upper end of rod 11 is adapted to contact, but is not connected to, a poppet valve 21 whose lower tapered cylindrical edge 22 is adapted to rest against the top of seat 18 under the urging of a biasing spring 24 located in a chamber 25 in housing 20 above the poppet's upper face.

The source pressure $P_S$, which can be air pressure from any suitable source, is applied to the control valve through a conduit 30 and enters the pilot valve portion of the control valve through a passage 30–3. The pilot valve produces an output pressure $P_P$ in an outlet passage 31 in accordance with the opening of the poppet 21 in response to the temperature sensed by probe 10. This occurs due to the change in length of the tube 12 which, for example, as the temperature sensed decreases, causes the tube to decrease in length and carry rod 11 with it toward the lower face of the poppet. Rod 11 is carried away from the poppet face when the temperature increases due to the increase in length of tube 12.

When rod 11 contacts the lower face of the poppet valve 21 it moves the poppet away from the seat 18 and causes air at pressure $P_S$ to flow through the pilot valve assembly into the outlet passage 31. Poppet valve 21 is pressure balanced by a hole 26 drilled therethrough which brings passage 31 and chamber 25 into communication to equalize the pressure at the two opposing faces of the valve. An O-ring 27 keeps the source pressure $P_S$ in passage 30–3 from entering chamber 25. Spring 24 causes valve 21 to move to a more closed position relative to seat 18 as probe 10 senses an increase in temperature which causes the tube 11 to increase in length and carry rod 11 away from the poppet lower face.

As should be clear, the pressure $P_P$ in the outlet passage 31 of the pilot valve section changes in accordance with the temperature sensed by probe 10. Pressure $P_P$ in passage 31 is applied by a suitable conduit, which may be external, to a chamber 35 through a passage 36 in the housing. A vent restrictor is preferably provided in the conduit from outlet 31 to chamber 35 to prevent the pressure in chamber 35 from increasing to equal the pressure in passage 30–3, that is, $P_P$ should be maintained at less than $P_S$, whenever there is the slightest opening of the pilot valve 21. The vent restrictor 38 makes the pressure in chamber 35 a function of the pilot valve opening which is in turn dependent upon the temperature acting on the probe 10. As can be seen, an increase in temperature sensed by probe 10 causes a decrease in pressure $P_P$ in chamber 35 and vice versa.

The lower portion of the pilot valve seat 18 is preferably screw-threaded into the lower end of the housing while the upper portion, which poppet 21 contacts, is stationary. The former permits setting the pressure in chamber 35 in relation to the temperature sensed by changing the distance between the poppet 21 and the rod 11 of probe 10 which actuates the poppet.

Chamber 35, in which the pilot valve pressure $P_P$ is present, is in communication with a diaphragm assembly formed by first (upper) and second (lower) diaphragms 40 and 41 which are sealed in the housing. A first chamber 65 is formed above diaphragm 40 and a second chamber 75 is formed below diaphragm 41. Diaphragm 41 has a smaller surface area in communication with chamber 35 than diaphragm 40. The two diaphragms carry a reset valve 45 by means of the flanges of retainer members 47 which are joined together by a shaft 48. Control valve 45 has a generally conical upper portion 46 which moves within the bore of a seat 49 at the bottom of a chamber 50 which is vented by a passage 52 to the vent pressure $P_V$.

The upper portion 46 of valve 45 has an extension 47 which is adapted to contact the lower surface of a poppet valve 55 to move it upwardly to push its tapered cylindrical upper surface against the seat 59 of a member 60. A lightly loaded spring 57 in a chamber 56 above the poppet 55 keeps the poppet 55 in contact with extension 47 of the reset valve 45. Chamber 56 is vented to pressure $P_V$ by a passage 58.

As should be clear from the above, a decrease in temperature sensed by probe 10 increases pressure $P_P$ in chamber 35. Since diaphragm 40 has a larger surface area than diaphragm 41, reset valve 45 moves upwardly tending to close poppet valve 55 against the seat 59. Reset valve 45 moves downwardly in response to a decrease in temperature.

The upper chamber 65, on the side of diaphragm 40 opposite chamber 35, receives reset pressure air at pressure $P_R$ provided through a restrictor 64 in an inlet passage 30–2 from the pressure supply source. Pressure $P_R$ is of course never higher than source pressure $P_S$. The reset pressure $P_R$ in chamber 65 is determined by the position of the reset valve 45 in relation to its seat 49. When the pilot valve pressure $P_P$ in control chamber 35 increases, the diaphragm assembly moves reset valve 45 toward a closed position increasing the pressure in chamber 65, which is vented through chamber 50 in passage 52, until a pressure balance is reached across the diaphragm assembly between the pressures in chambers 35 and 65. The amount of diaphragm assembly movement required to balance the pressure in chamber 65 against the opposing pressure forces in chambers 35 and 75 is determined by the size of restrictor 64 and the size and shape of reset valve 45 and seat 49.

The air for the control pressure $P_C$ enters the housing through passage 30–1 from the source, passes through a restrictor 70, and is metered by the poppet valve 55 to an outflow passage 72. When the poppet valve 55 is closed against its seat 59, the pressure in passage 72 is equal to the pressure produced by the restrictor 70 in response to the supply pressure $P_S$ since there is communication between outlet passage 72 and the high pressure side of the restrictor 70 in inlet passage 30–1 through an opening 73 formed around the seat of member 60 between the two passages. When the poppet 55 is partially opened, air on the high pressure side of restrictor 70 is vented out through chamber 57 and port 58. Thus, $P_C$ is equal to or less than the pressure on the high pressure side of restrictor 70.

The output pressure $P_C$ in passage 72 is used to position a temperature control valve, such as the inlet valve 104 of FIG. 1. The pressure $P_C$ in outlet passage 72 is adjusted for any position of poppet valve 55 by adjusting the position of the member 60 which carries seat 59. This is preferably done by making the member 60 screw threaded. Air O-ring 61 seals off member 60 from the passages 30–1 and 72.

A system such as in FIG. 1, where valve 1 controls the metering of hot air to be mixed with cold air, requires an increase in pressure $P_C$ when the temperature drops in duct 102. This is accomplished in the valve of FIG. 2 as follows; measurement of a decrease in duct temperature by probe 10 opens pilot valve poppet 21 which in turn increases $P_P$ in chamber 35 tending to close reset valve 45 and poppet 55 to increase $P_C$ toward its maximum value. This opens valve 104 to supply more hot air to duct 102 and raise the temperature sensed by probe 10. An increase in temperature monitored by probe 10, tends to close poppet 21, decreasing $P_P$ thereby venting the down stream side of restrictor 70 to decrease $P_C$ and tend to close inlet valve 104 and reduce the amount of hot air entering duct 102.

By properly sizing restrictor 64, which supplies reset pressure $P_R$ to chamber 65, and appropriate design of the reset valve 45, the movement of poppet 55 can be amplified as compared to the movement of the pilot valve poppet 21. It should be understood that the bimetallic sensing probe 10 has a relatively small movement resulting in a small movement of pilot valve poppet 21. This makes the change in pilot control pressure $P_P$ in passage 31 and chamber 35 relatively small per degree of temperature change sensed by probe 10, assuming a reasonable size for the vent restrictor 38.

In the valve of FIG. 2 the diaphragm assembly and reset valve 45 acting on poppet 55 control the pressure $P_C$ in passage 72 in an amplified manner due to the amplification of the pressure change in the $P_P$ pressure chamber 35. The amount of amplification is dependent upon the design of restrictor 70, poppet 55, seat 59, the reset valve 45 and its seat 49, restrictor 64 and the general configuration of the diaphragm assembly.

The complete temperature sensor and amplifier valve 1 of FIG. 2 can be sized to produce a specific change in pressure $P_C$ at passage 72 in response to a given temperature change sensed by probe 10. In addition, the restrictors 38, 64 and 70 can be made externally adjustable, if desired, to make the control more adaptable over a wide range of conditions and requirements.

The temperature set point about which the control valve 1 of FIG. 2 is operated can be remotely adjusted by a controlled pressure source, such as a pressure regulator. The output pressure $P_A$ of the regulator is applied through a passage 74 in the housing to chamber 75 which acts on the lower side of the smaller area lower diaphragm 41. Increased pressure in chamber 75 acting upon diaphragm 41 acts in the same sense as the pressure in chamber 35 and tends to close the poppet 55 by moving the reset valve 45 upwardly. This would increase the pressure $P_C$ in passage 72 available for application to the inlet valve 104. An increase in pressure $P_C$ causes inlet valve 104 to open and increase the temperature sensed by probe 10. This increased temperature contracts rod 11 tending to close the pilot valve poppet 21 to reduce the pressure in passage 31 and chamber 35. A reduction in pressure in chamber 35, which acts against both diaphragms 40 and 41 causes a decrease in the force which is pushing upwardly on valve poppet 55 tending to close it. In this way, a balance is reached across the diaphragm assembly with the probe 10 sensing an increased temperature.

Decreasing pressure $P_A$ in chamber 75 results in a balanced assembly at a lower temperature acting upon sensing probe 10 since the pressure aiding diaphragm 35 is reduced. Therefore, the predetermined temperature which valve 1 is to controllably maintain, is adjustable externally by changing $P_A$. It should be understood that the adjustment provided by the diaphragm 41, chamber 75 and the remote pressure $P_A$ can be eliminated. The action of the valve would be similar to that described except that the predetermined temperature point adjustment could not be made remotely.

While the probe, pilot valve assembly, and the amplifier valve assembly are shown in a single housing 20 in FIG. 2, it should be understood that they can be made as separate units. When made as separate units, for example, the amplifier assembly can be used with any type of sensing unit whoses output signal is a pressure change as a function of its input signal.

Figure 3:
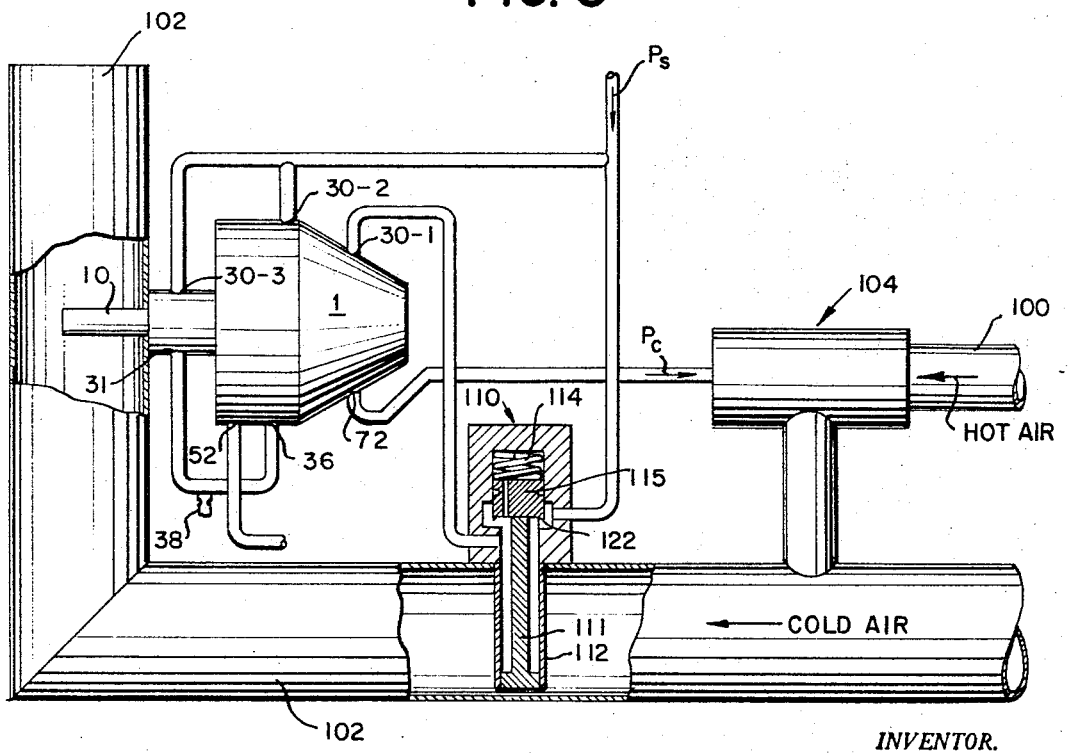
FIGURE 3 is a schematic diagram of another type of heat control system using the valve of the present invention and an anticipator.

FIGURE 3, is another embodiment of the invention in which the restrictor 70 for supplying the control pressure air $P_C$ is replaced by a temperature anticipating device 110 which is used to prevent extreme temperature changes from occurring within a compartment when a temperature sensor and amplifier control assembly 1 is used to control the compartment temperature. Similar reference characters are used to designate the same elements as in FIGS. 1 and 2.

The anticipator 110 is similar in construction to the pilot valve portion of the control valve 1 and meters the $P_S$ air to the control valve 1. Here, however, a rod 111 and a tube 112 of the temperature sensing probe are made of similar material. For example, stainless steel may be utilized for both. With a sudden increase in the temperature in the main duct 102, tube 112 elongates carrying rod 111 with it. The upper end of rod 111 contacts a poppet valve 115 which is loaded by a spring 114 and allows the poppet valve to move toward a more closed position with reference to its seat 122. This results in a reduction in pressure of $P_S$ air flow through the anticipator 110 which causes a decrease in the source pressure $P_S$ applied to inlet passage 30–1 of valve 1. This results in a decrease in the control pressure $P_C$ causing inlet valve 104 to move toward a more closed position tending to reduce the temperature of the air in main duct 102 to the original temperature level. A correcting action in the opposite direction occurs with a sudden decrease in the mixed air temperature in duct 102. This is a relatively fast response since the anticipator 110 quickly reduces the $P_S$ pressure in passage 30–1 to control valve 1.

A slower secondary action of the anticipator 110 occurs when the temperature of the mixed air in duct 102 penetrates to the rod 111. Elongation of rod 111 in response to an increase in mixed air temperature acts in the opposite direction to the elongation of tube 112. This tends to open the poppet valve 115 by removing the force opposing that of biasing spring 114. This causes the poppet valve to return to the normal control position.

The system of FIG. 3 is preferably used when a temperature sensing control device 1 is located in a rather large compartment. Due to the lag in sensing temperature changes within the compartment, without the anticipator, a sudden change in mixed air temperature could cause extreme temperature changes at the entrance to the compartment. The anticipator prevents extreme temperature changes and tends to restrain the temperature in the mixed air duct. When a temperature change within the compartment is detected, the hot air inlet valve position is adjusted by the compartment temperature sensor control 1 to correct the error.

While preferred embodiments of the invention have been described above, it will be understood that these are illustrative only, and the invention is limited solely by the appended claims.

What is claimed is:

1. A temperature sensitive control operating from a source of pressure to produce an output control pressure comprising: a probe for sensing an external temperature and changing its length by an amount corresponding to a temperature change sensed, a pilot valve having a valve member, means operating said pilot valve in response to the change of length of the probe to produce a change of pilot pressure, a metering valve receiving the pressure from said source having a valve member, and means for amplifying the change of pilot pressure to operate said metering valve member to produce said control pressure.

2. A temperature sensitive control as in claim 1 wherein said amplifying means includes a housing having a first chamber therein for receiving said pilot pressure, and first means communicating with said first chamber for operating the valve member of the metering valve.

3. A temperature sensitive control as in claim 2 wherein said housing is formed with a second chamber also in communication with said first means, said second chamber receiving pressure from a source for opposing the action of said first means produced by said pilot pressure.

4. A temperature sensitive control as in claim 3 wherein said housing is formed with a third chamber receiving pressure from a source, said control including second means in communication with said third chamber and one of said first and second chambers for adjusting the pressure at which the valve member of the metering valve is operated by the pressures in said first and second chambers in response to the temperature sensed by the probe.

5. A temperature sensitive control as in claim 3 wherein said first means includes a first diaphragm disposed in communication with said first and second chambers whose movement operates means for moving the valve member of said metering valve.

6. A temperature sensitive valve as in claim 3 further comprising a respective restrictor means for applying pressure from a common source to the metering valve and the second chamber.

7. A temperature sensitive valve as in claim 4 wherein said first and second means comprise first and second diaphragm means respectively communicating with said first and second and said second and third chambers, and means operated by the combined movements of said first and second diaphragm members for moving the valve member of said metering valve.

8. A temperature sensitive control as in claim 1 wherein said temperature sensitive probe comprises a tube member and a rod member joined together at one end thereof, the other end of one of said rod and tube members being fixedly connected to a point and the unconnected other end of the other of said rod and tube members operating said valve member of said pilot valve.

9. A temperature sensitive probe as in claim 8 wherein said rod and tube members are made of materials having different coefficients of thermal expansion.

10. A temperature sensitive control as in claim 2 wherein said temperature sensitive probe comprises a tube member and a rod member joined together at one end thereof, the other end of one of said rod and tube members being fixedly connected to a point and the unconnected other end of the other of said rod and tube members operating said valve member of said pilot valve.

11. A temperature sensitive control as in claim 3 wherein said temperature sensitive probe comprises a tube member and a rod member joined together at one end thereof, the other end of one of said rod and tube members being fixedly connected to a point and the unconnected other end of the other of said rod and tube members operating said valve member of said pilot valve.

12. A temperature sensitive control as in claim 4 wherein said temperature sensitive probe comprises a tube member and a rod member joined together at one end thereof, the other end of one of said rod and tube members being fixedly connected to a point and the unconnected other end of the other of said rod and tube members operating said valve member of said pilot valve.

13. A temperature sensitive control as in claim 5 wherein said temperature sensitive probe comprises a tube member and a rod member joined together at one end thereof, the other end of one of said rod and tube members being fixedly connected to a point and the unconnected other end of the other of said rod and tube members operating said valve member of said pilot valve.

14. A temperature control system as in claim 15 wherein said second temperature sensing probe includes a rod member and a tube member joined together at one end thereof, the other end of one of said rod and tube members being fixedly connected to a point and the unconnected other end of the other of said rod and tube members operating said supply pressure changing means, said rod and tube members being of materials having substantially the same coefficients of thermal expansion.

15. A temperature control system comprising: a temperature sensitive control means operating from a source of pressure to produce an output control pressure, said control means including a probe for sensing an external temperature and producing a movement corresponding thereto, a pilot valve having a valve member which is operated by the movement produced by the probe to produce a pilot pressure, and a metering valve receiving the pressure from said source having a valve member operated in response to the pilot pressure to produce said control pressure; anticipator means interposed between the source of pressure and the pressure signal applied to said temperature sensitive control to produce the output control pressure, said anticipator means comprising a second probe for sensing the external temperature and producing a movement corresponding thereto, and means responsive to the movement produced by the second probe for changing the supply pressure applied to the temperature sensitive control.

16. A temperature control system as in claim 15 wherein said temperature sensitive control means further comprises a housing having a first chamber therein for receiving said pilot pressure, and first means communicating with said first chamber for operating the valve member of the metering valve, a second chamber also formed in said housing and also in communication with said first means, said second chamber receiving pressure from a source for opposing the action of said first means produced by said pilot pressure.

17. A temperature control system as set forth in claim 16 wherein said temperature sensitive probe of said temperature sensitive control means comprises a tube member and a rod member joined together at one end thereof, the other end of one of said rod and tube members being fixedly connected to a point and the unconnected other end of the other of said rod and tube members operating said valve member of said pilot valve.

18. A temperature control system as set forth in claim 16 wherein first means includes a first diaphragm disposed in communication with said first and second chambers whose movement operates means for moving the valve member of said metering valve, and wherein said temperature sensitive probe comprises a tube member and a rod member joined together at one end thereof, the other end of one of said rod and tube members being fixedly connected to a point and the unconnected other end of the other of said rod and tube members operating said valve member of said pilot valve.

19. A temperature sensitive control as in claim 1 further comprising means for pressure balancing said pilot valve.

20. A temperature sensitive control as in claim 1 further comprising means for pressure balancing said metering valve.

21. A temperature sensitive control as in claim 19 further comprising means for pressure balancing said metering valve.

References Cited

UNITED STATES PATENTS

| | | | |
|---|---|---|---|
| 2,278,016 | 3/1942 | Otto | 236—82 |
| 2,278,402 | 3/1942 | Harris | 236—82 |
| 2,536,184 | 1/1951 | Johnson | 236—82 |
| 2,575,085 | 11/1951 | Alyea | 236—82 X |
| 2,638,911 | 5/1953 | Griswold | 236—82 X |
| 2,638,920 | 5/1953 | Woodhull | 236—82 X |
| 2,867,194 | 1/1959 | Jensen | 236—82 X |
| 2,966,308 | 12/1960 | Jensen | 236—82 |
| 2,985,374 | 5/1961 | Jensen | 236—324 |
| 2,991,631 | 7/1961 | Ray | 62—324 |
| 3,126,947 | 3/1964 | Jensen | 236—82 X |

WILLIAM J. WYE, *Primary Examiner.*